United States Patent [19]

Tomazic

[11] Patent Number: 5,702,842
[45] Date of Patent: Dec. 30, 1997

[54] PROCESS FOR CHARGING AND DISCHARGING ZINC/BROMINE BATTERIES

[75] Inventor: Gerd Tomazic, Mürzzuschlag, Austria

[73] Assignee: Elin Energieanwendung Gesellschaft M.B.H., Vienna, Austria

[21] Appl. No.: 464,620

[22] PCT Filed: Dec. 22, 1993

[86] PCT No.: PCT/AT93/00197

§ 371 Date: Jun. 23, 1995

§ 102(e) Date: Jun. 23, 1995

[87] PCT Pub. No.: WO94/15372

PCT Pub. Date: Jul. 7, 1994

[30] Foreign Application Priority Data

Dec. 23, 1992 [AT] Austria .................. A2554/92

[51] Int. Cl.$^6$ .................................................. H01M 10/42
[52] U.S. Cl. ...................... 429/105; 429/51; 429/62; 429/63; 429/198
[58] Field of Search .................... 429/50, 51, 61, 429/62, 63, 105, 198

[56] References Cited

U.S. PATENT DOCUMENTS

| | | | |
|---|---|---|---|
| 4,321,312 | 3/1982 | Fujii et al. | 429/105 |
| 4,399,200 | 8/1983 | Galloway | 429/63 |
| 4,491,625 | 1/1985 | Katner | 429/50 |
| 4,615,108 | 10/1986 | Tomazic . | |
| 4,691,158 | 9/1987 | Hashimoto et al. | 320/14 |
| 4,818,642 | 4/1989 | Bellows et al. | 429/105 |
| 5,061,578 | 10/1991 | Kozuma et al. | 429/51 |

FOREIGN PATENT DOCUMENTS

| | | | |
|---|---|---|---|
| 149448 | 7/1985 | European Pat. Off. . | |
| 0277937 | 8/1988 | European Pat. Off. | H01M 10/44 |
| 0411614 | 2/1991 | European Pat. Off. | H01M 12/08 |

OTHER PUBLICATIONS

Patent Abstracts of Japan, vol. 14, 467 E-989 abstract of JP, A, 2-189868, Jul. 1990.
Linden, "Handbook of Batteries and Fuel Cells", McGraw Hill, pp. 29-1 to 29-8 and A4 (no month), 1984.
Patent Abstracts of Japan, vol. 14, No. 467, E-989, Abstract of Japanese Patent Publication No. 2-189868 (Toyota Motor Corp.), Jul. 25, 1990.

*Primary Examiner*—Prince Willis, Jr.
*Assistant Examiner*—Carol Chaney
*Attorney, Agent, or Firm*—Greenblum & Bernstein P.L.C.

[57] ABSTRACT

A process for charging and discharging zinc/bromine batteries with a plurality of anode and cathode chambers into and from which anolyte or catholyte fluids are fed and drained. Metallic zinc is deposited on the anode and atomic and/or molecular bromine is deposited at the cathode, and bromine is bonded in an only slightly water soluble complex with a complex-forming agent from the aqueous phase. The anolyte and/or catholyte fluids are circulated periodically. The oleophilic cathode phase is separated from the hydrophilic cathode phase. Only the aqueous phase of the catholyte is circulated through the cathode chambers, and the times at which the fluid is circulated is dependent upon the temperature of the anolyte in the anode chambers.

12 Claims, 1 Drawing Sheet

PROCESS FOR CHARGING AND DISCHARGING ZINC/BROMINE BATTERIES

The present invention relates to a process for charging and discharging zinc/bromine batteries, having a plurality of electrodes, bipolar ones in particular, and a plurality of anode and cathode spaces into which optionally temperature-stabilized catholyte or catolyte fluid is introduced.

Voltaic cells based on the zinc/bromine pairing can be particularly efficient. The high reactivity of bromine, though, requires a particular choice of materials; plastics, for example polyethylene or polypropylene, are preferred materials, because of their high chemical resistance to bromine. The construction of zinc/bromine batteries with plastic is done in such a way that on the one hand, bipolar electrodes are provided, which are constructed with plastic-bonded carbon, for example graphite, activated charcoal, and the like. Between the electrodes, diaphragms are disposed, which are likewise comprised of plastic, in particular polypropylene or polyethylene. The diaphragms or electrodes have thickenings on their edges so that packets of electrodes, between each of which diaphragms are disposed, create electrode spaces, specifically anode and cathode spaces. These spaces are supplied and emptied via separate lines. The electrolytes, specifically the catholyte and catholyte, each have at their disposal separate loops with separate reservoirs and pumps associated with each of these. If need be, the pumps can be driven by a common electromotor.

The storage of the zinc is effected in metallic form on the surface of the electrode. If the electrolyte composition is inadequate, or if there are excessive current densities, dendrite formation can occur, which on the one hand can cause damage to the diaphragms; on the other hand, for example upon discharging, zinc fragments can be formed, which are no longer connected to the electrode via a first-class electrical conductor. These zinc fragments cause malfunctions, which among other things can lead to individual electrode spaces not being supplied with the electrolyte fluid, since the supply lines or also the drain lines are clogged with the zinc fragments. These malfunctions can be solved, according to European Patent Application Serial No. EP-A-0149448, by introducing bromine-containing electrolyte into the electrolyte space which has the zinc, so that the zinc attains dissolution not electrochemically, but purely chemically, and hence there is no need to connect zinc fragments to the electrode. This introduction of bromine-containing electrolyte fluid into the electrode spaces, in which zinc is precipitated, can take place for example at the end of a discharging process; bromine-containing electrolyte is supplied, by means of which the zinc can be chemically dissolved.

Although zinc/bromine batteries have been developed in which the bromine is also deposited on the electrode surface, nevertheless if a larger capacity is to be achieved, then the bromine must be stored outside the electrode. A preferred process for binding of free bromine is comprised in that a complexing agent is dissolved in the aqueous electrolyte, which agent forms a complex with the bromine, which dissolves in water only with difficulty, so that the electrolyte has an aqueous phase and a hydrophobic phase. The hydrophobic phase can be stored together with the aqueous phase in an electrolyte vessel. The hydrophobic phase is also on the surface of the cathode, next to the aqueous phase, during both charging and discharging. Since the cathode surface as a rule has an increased surface area, for example by means of the embedding of carbon fibers, carbon particles, or the like, the hydrophobic phase additionally adheres to the surface of the cathode. Consequently, after a charging or discharging process, there is a bromine concentration in the cathode space, which is required for carrying out the electrochemical process. In order to decrease the bromine concentration, in the internal prior art, after an electrochemical reaction, the electrode space is rinsed out with the aqueous phase; care is taken that there be no hydrophobic phase with a high bromine concentration in the electrode space. Despite the relatively large size of bromine molecule, the bromine which is in the cathode space seeps through the diaphragm into the anode space and dissolves metallic zinc there. Hence, on the one hand, the capacity of the battery is reduced and on the other hand, the chemical reaction is strongly exothermic, so that the battery experiences a powerful temperature increase in the resting phase. This temperature increase is of particular significance if the battery has an additional covering to prevent the escape of bromine, even when electrolyte cells are damaged. The thermic strain on the anode or cathnode spaces causes distortion of both the diaphragms and the electrodes, which as a rule are made of plastic. Since both the anode space and the cathode space have a particularly low thickness normal to the surface of the electrodes, distortions of this kind can lead to irregular through flows of the electrode spaces and with these to undesired resistance- and capacitance changes of the battery.

The object of the present invention is to create a process in which thermic strain on the battery during the resting state can be prevented and the consumption of additional energy, electrical energy in particular, is especially easily avoided, so that deformations of the battery, which are ascribed both to thermic causes and to reductions in capacitance, can be prevented with particular ease.

The process according to the invention for charging and discharging zinc/bromine batteries, having a plurality of electrodes, bipolar ones in particular, and a plurality of anode and cathode spaces into which optionally temperature-stabilized anolyte or catolyte fluids respectively are separately supplied to and drained from reservoirs, wherein in charging, metallic zinc is precipitated out at the anode (negative electrode) and atomic and/or molecular bromine is precipitated out at the cathode, (positive electrode) and bromine is bound in a complex, which is poorly soluble in water, with a complexing agent from the aqueous phase, and the cathode spaces are connected to the anode spaces via diaphragms, and wherein in charging and discharging, the catholyte and/or anolyte fluid is kept circulating, at least intermittently, and wherein in the reservoir for the catholyte fluid, separation of an oleophilic catholyte phase from a hydrophilic catholyte phase, with drain- and supply lines available, is effected, is defined essentially in that an exclusively aqueous phase of the catholyte fluid is passed through the cathode spaces, chronologically after the supply and/or draining of electrical energy, and then a temporal interruption occurs, whereupon the aqueous phase is once again intermittently passed (circulated) through the cathode spaces.

Since only the aqueous phase is employed or used, any additional increase in the bromine concentration can be prevented; thus at the same time, rinsing of the cathode surface can be carried out in a particularly effective manner. By maintaining pauses between the individual rinsing phases, on the one hand, the consumption of electrical energy, such as for pumped recirculation, is kept low, and on the other hand, even in the resting state of the electrolyte, a separation of the bromine complex from the cathode surface can take place by means of dissolution in the aqueous phase. This dissolving process is very time-dependent and is adequately fast, even when the electrolyte is in a resting state. The concentration of the free bromine in the cathode space is consequently sharply increased so that the penetration speed of the bromine through the diaphragm to the anode space would be significant if the electrolyte in the cathode space were exchanged in order to prevent this crossing over.

If a temporary pause is provided after a current drain and after the pumped recirculation that follows of the purely aqueous phase of the electrolyte, then in this pause a dissolving of the bromine complex, which is still adhering to the fiber or the like, into the aqueous phase can take place. This aqueous phase, which at this point is enriched with bromine, can easily be replaced by a pure aqueous phase, which is to a large extent bromine-free, by means of a further rinsing process.

If a diversion (circulation) of the aqueous phase of the electrolyte occurs at least twice, then an essential reduction of the bromine concentration in the cathode spaces is possible, with a particularly low energy expenditure for the diversion of the electrolyte.

If temporary pauses are maintained that are 10–30 times, preferably 15–20 times, as long as the diversion time of the aqueous electrolyte, then the dissolving process in the aqueous phase, which proceeds slowly, is particularly favorably taken into account.

If the diversion of the aqueous phase is initiated depending on the temperature, in particular of the anode fluid in the anode space, then the control can be carried out merely by means of a thermal switch without providing a separate time function element. The temperature control can also be made to depend for example on the temperature in the anode space at the cell output, since the exothermic chemical reaction takes place in this space, so that the heat conduction by means of the diaphragm does not act as a time delay element.

If the diversion of the aqueous phase is switched on and/or off by means of a time switch element, in particular depending upon the duration of diversion, then a predetermined control for fixed sizes of batteries can be carried out, by means of which the control of the thermal economy of a battery is embodied in a particularly simple and effective manner.

If the diversion of the aqueous phase of the electrolyte after the draining or supply of electrical energy, is carried out at a low flow velocity, in particular at ⅓ to ½ the flow velocity of the one during the charging and/or discharging, then turbulent flow phenomena such as eddies and the like are prevented in the reservoir, so that the formation of a suspension can be considered unlikely.

If the anolyte is diverted at the same time as the aqueous phase of the catholyte fluid, then a depletion of the bromine concentration in the anode space takes place; identical fluid pressures can be maintained in the cathode space and in the anode space as well.

The invention is further explained below from the examples and the drawing.

EXAMPLE 1

In a zinc/bromine battery with bipolar electrodes, which each had an area of 1200 cm$^2$ and which were separated from one another via diaphragms, by means of which anode and cathode spaces were formed, which were each separately supplied with the anolyte or catolyte. The flow velocity during charging and discharging was approximately 1 cm/sec at the electrode surface. The flow velocity was approximately 0.3–0.5 cm/sec when the electrolyte fluid was being diverted.

The aqueous electrolyte had the following chemical composition:

2.3 mol/l zinc bromide 1 mol/l potassium chloride 1 mol/l methylethyl morpholinium bromide The complexing agent, specifically methylethyl morpholinium bromide, forms a complex with bromine that is poorly soluble in water; specifically, 2–3 g per liter of the bromine complex dissolves in the aqueous electrolyte, depending upon the temperature. The battery had 32 electrodes, so that a total voltage of 48 volts could nominally be achieved. The temperature measurement was carried out in the anode space of a centrally disposed anode; heat radiation was kept particularly low by a further covering of the battery, in order to prevent any escape of electrolyte fluid from the battery.

Figure 1:
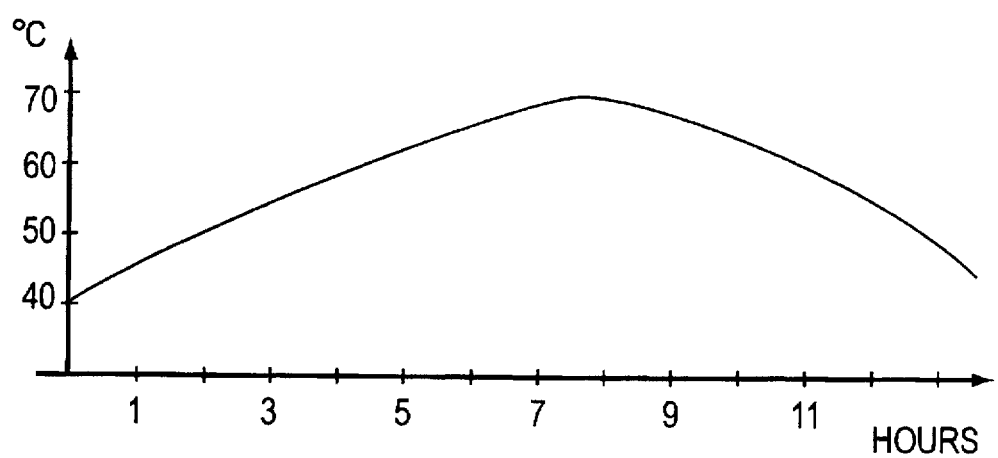
FIGS. 1–3 show the course of temperature over time in different rinsing processes.

As can be inferred from FIG. 1, after the end of the charging procedure, the temperature was increased to approximately 70°, and in fact the battery was charged up to 80% of its capacity without corresponding rinsing procedures being provided. This temperature increase occurred 8 hours after the end of the charging procedure. A temperature decrease then took place. This process of long-term temperature increase can be explained by the crossover of bromine from the cathode space through the diaphragm into the anode space, by means of which an exothermic reaction between bromine and zinc can take place.

EXAMPLE 2

Figure 2:
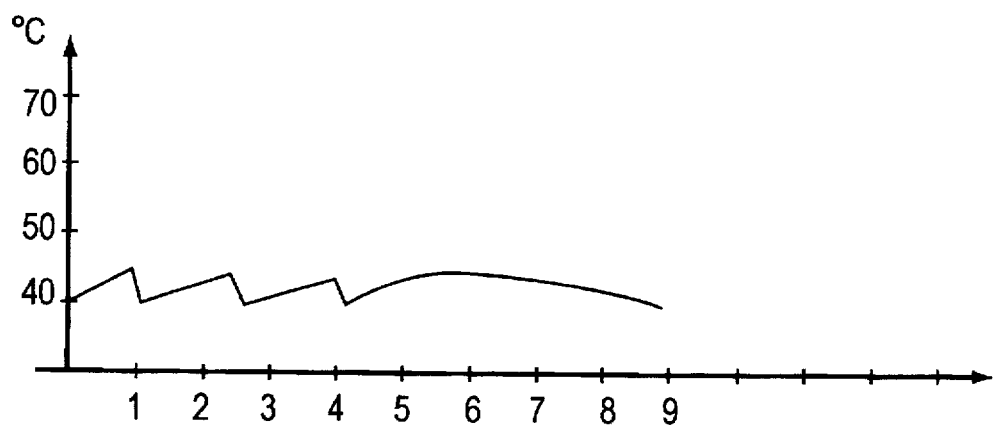

In a battery according to Example 1, after predetermined time intervals of 60 minutes each, a 4 minute rinsing with the aqueous electrolyte was carried out. There was a wait until precipitation of the bromine complex in the reservoir took place; then the catholyte was removed by suction so that no suspension, but only the catholyte exclusively, could be pumped into the cathode spaces. As is apparent, it was possible to prevent excessive thermic strain on the battery by means of the rinsing procedures, which are chronologically preset with the control over time, there is also a dependency on the outside temperature and hence various maximum temperatures can occur inside the battery. The course of temperature in the anode space is described in FIG. 2; the brief temperature drop, which occurs three times, indicates the rinse procedures. The maximum temperature comes to approximately 48°.

EXAMPLE 3

Figure 3:

The control of the diversion of the anode fluid was carried out via the temperature of the anolyte in the anode space; each time the temperature reached 50°, a pumped recirculation of the cathode fluid in the cathode space was carried out. This type of control offers the advantage that preset temperatures are not ever exceeded and consequently an inadmissible thermic strain on the battery is prevented in any case. The temperature course is shown in FIG. 3.

In the examples, the anode fluid was diverted together with the cathode fluid.

The embodiment of the battery can be inferred from EP-A-0149.448, which comprises a component of the present invention.

All ionogenic compounds that are neither precipitated nor decomposed during the charging or discharging process can be used as the conducting salt, such as KCl or NaCl.

All kinds of compounds can serve as the complexing agent for the bromine, for example methylethyl morpholinium bromide, or methylethyl pyrolinium bromide.

I claim:

1. A process for charging and discharging zinc/bromine batteries with a plurality of bipolar electrodes including a positive electrode and a negative electrode, a plurality of cathode spaces associated with the positive electrode and a plurality of anode spaces associated with the negative electrode, an anolyte reservoir associated with the negative electrode for supplying a circulating anolyte fluid, a cathodelyte reservoir associated with the positive electrode for supplying a circulating cathodelyte fluid, said process comprising:

during a charging phase, precipitating out metallic zinc at the negative electrode;

depositing at least one of atomic and molecular bromine onto the positive electrode;

binding bromine from an aqueous phase in a poorly water soluble complex with a complex former, wherein the anode spaces and the cathode spaces communicate via diaphragms, during a charging and a discharging phase, circulating at least one of the fluid and fluid;

separating, within the catholyte reservoir, an oleophilic cathotyte phase from a hydrophilic catholyte phase; and after supplying or removing electrical energy from the zinc-bromine battery, passing only the aqueous phase of the catholyte fluid through the cathode spaces and thereafter effecting a temporary interruption and intermittently circulating the aqueous phase through the cathode spaces, wherein the circulation of the aqueous phase is initiated as a function of temperature of the anolyte fluid in the anode space.

2. The process according to claim 1, characterized in that a temporary pause is provided between the draining of current and the next circulation of the aqueous phase of the electrolyte.

3. The process according to claim 1, characterized in that a circulation of the aqueous phase of the electrolyte takes place at least twice.

4. The process according to claim 1, characterized in that the temporary pauses of the diversion of the aqueous phase are from 10–30 times, as long as the circulation time.

5. The process according to claim 1, characterized in that the ciculation of the aqueous phase is switched at least one of on and off by means of a time switch element.

6. The process according to claim 1, characterized in that the circulation of the aqueous phase of the electrolyte after the draining or supply of electrical energy is carried out at a low flow velocity, of approximately ⅓ to ½ the flow velocity of the circulation done during at least one of charging and discharging.

7. The process according to claim 1, characterized in that the anolyte is circulated at the same time as the aqueous phase of the catholyte fluid.

8. The process according to claim 1, said circulating at least one of the anolyte and the catholyte fluid comprising intermittent circulation.

9. The process according to claim 1, wherein, after the electrical energy is removed or supplied, the circulation of the aqueous phase of the anolyte fluid occurs with a flow velocity less than a flow velocity occurring during at least one of charging and discharging.

10. The process according to claim 9, the flow velocity of the circulation being between approximately one-third and approximately one-half the flow velocity occurring during at least one of charging and discharging.

11. The process according to claim 9, the anolyte is circulated concurrently with the aqueous phase of the catholyte fluid.

12. The process according to claim 1, characterized in that the temporary pauses of the circulation of the aqueous phase are from 15–20 times as long as the circulation time.

* * * * *